US00RE39122E

(19) United States
(12) Reissued Patent
Henderson et al.

(10) Patent Number: US RE39,122 E
(45) Date of Reissued Patent: Jun. 13, 2006

(54) REGENERATIVE COMPRESSED AIR/GAS DRYER

(75) Inventors: Charles A. Henderson, Wheaton, IL (US); Terry D. Henderson, Naperville, IL (US)

(73) Assignee: Henderson Engineering Co., Inc., Sandwich, IL (US)

(21) Appl. No.: 09/946,657

(22) Filed: Sep. 5, 2001

Related U.S. Patent Documents

Reissue of:
(64) Patent No.: 6,171,377
Issued: Jan. 9, 2001
Appl. No.: 09/352,979
Filed: Jul. 14, 1999

(51) Int. Cl.
*B01D 53/04* (2006.01)
*B01D 53/26* (2006.01)

(52) U.S. Cl. ..... 96/122; 95/41; 95/120; 95/126; 96/111; 96/128; 96/130; 96/143; 96/144

(58) Field of Classification Search ..... 95/39, 95/41, 117, 120, 126; 96/111, 122, 126–128, 96/130, 133, 143, 144, 146
See application file for complete search history.

(56) References Cited

U.S. PATENT DOCUMENTS 1,831,644 A * 11/1931 Adair et al. ..... 95/41 X
3,011,589 A * 12/1961 Meyer ..... 95/41
3,950,154 A * 4/1976 Henderson et al. ..... 55/179
4,769,051 A * 9/1988 Defrancesco ..... 96/144 X
4,783,432 A * 11/1988 Settlemyer ..... 502/34
5,137,548 A * 8/1992 Grenier et al. ..... 95/41
5,152,812 A * 10/1992 Kovach ..... 95/41
5,234,479 A * 8/1993 Henderson et al. ..... 95/105
5,376,164 A * 12/1994 Zarchy et al. ..... 95/41
5,453,112 A * 9/1995 Sinicropi et al. ..... 95/41
5,500,035 A * 3/1996 Zarchy et al. ..... 95/41
5,658,369 A * 8/1997 Kusay ..... 95/41
5,759,236 A * 6/1998 Bruck et al. ..... 95/41

* cited by examiner

*Primary Examiner*—Robert H. Spitzer
(74) *Attorney, Agent, or Firm*—Trexler, Bushnell, Giangiorgi, Blackstone & Marr, Ltd.

(57) ABSTRACT

A system for drying a gas, such as air, includes a source of gas to be dried, a multistage compressor having an inlet connected to the source, and a dryer connected interstage to the compressor and to the outlet of the compressor. The dryer is connected interstage to the compressor between a compression stage and a heat exchanger of one of the compressor stages for regenerating a first desiccant filled tower. The dryer is also connected to the outlet of the compressor for drying the gas using a second desiccant filled tower. A communication structure can be activated to connect the first tower to the outlet of the compressor for drying the gas using the first tower, and to connect the second tower interstage to the compressor for regeneration of the second tower.

36 Claims, 2 Drawing Sheets

REGENERATIVE COMPRESSED AIR/GAS DRYER

Matter enclosed in heavy brackets [ ] appears in the original patent but forms no part of this reissue specification; matter printed in italics indicates the additions made by reissue.

BACKGROUND OF THE INVENTION

This invention is generally directed to a novel regenerative compressed gas dryer system. More particularly, the invention contemplates a dryer and an integrated multi-stage compressor for drying a gas, such as air, which have been combined to enhance the total system performance versus prior art dryer-systems.

Today, all dryers are designed to operate at the outlet of the compressor. With a heat of compression type dryer, the discharge temperature of the air at the outlet of the compressor is a critical item that determines the efficiency of the dryer. Many compressors have low discharge temperatures and thus the dryer that regenerates at the outlet is able to provide very limited performance. The present invention overcomes or minimizes the deficiencies of the prior art by connecting the drier at an interstage of the compressor for regeneration, and by connecting the dryer at the outlet of the compressor for drying.

In addition, traditionally, compressors and dryers are sold as distinct and separate products. Typically, the compressor is sold with a heat exchanger and a separator that are located at the outlet of the compressor. The dryer is considered to be an accessory product and many times is not sold by the compressor manufacturer or compressor distributor. A difference between the prior art and the present invention is the marriage or integration of the compressor and the dryer to provide improved performance over prior art systems.

Other features and advantages will become apparent upon a reading of the attached specification, in combination with a study of the drawings.

OBJECTS AND SUMMARY OF THE INVENTION

A general object of the present invention is to provide a novel regenerative compressed gas dryer system which includes an integrated multi-stage compressor and a dryer which has been combined to enhance the total system performance versus prior art dryer systems.

An object of the present invention is to provide a novel regenerative compressed gas dryer system which connects the dryer interstage to one of the compressor stages between the compression stage and the heat exchanger for regeneration, and connects the dryer to the outlet of the compressor for drying the gas.

Another object of the present invention is to provide a novel regenerative compressed gas dryer system which can be used with a high pressure compressor.

A further object of the present invention is to provide a novel regenerative compressed gas dryer system which has multiple stages with regeneration occurring interstage of any of the stages.

Briefly, and in accordance with the foregoing, the present invention discloses a novel system for drying gas, such as air. The system includes a source of gas, such as air, to be dried, a multi-stage compressor having as inlet connected to the source, and a dryer connected interstage to the compressor and to the outlet of the compressor. A dryer is connected interstage to the compressor between a compression stage and a heat exchanger of one of the compressor stages for regenerating a first desiccant filled tower. The dryer is also connected to the outlet of the compressor for drying the gas using a second desiccant filled tower. A communication structure can be activated to connect the first tower to the outlet of the compressor for drying the gas using the first tower, and to connect the second tower interstage to the compressor for regeneration of the second tower.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
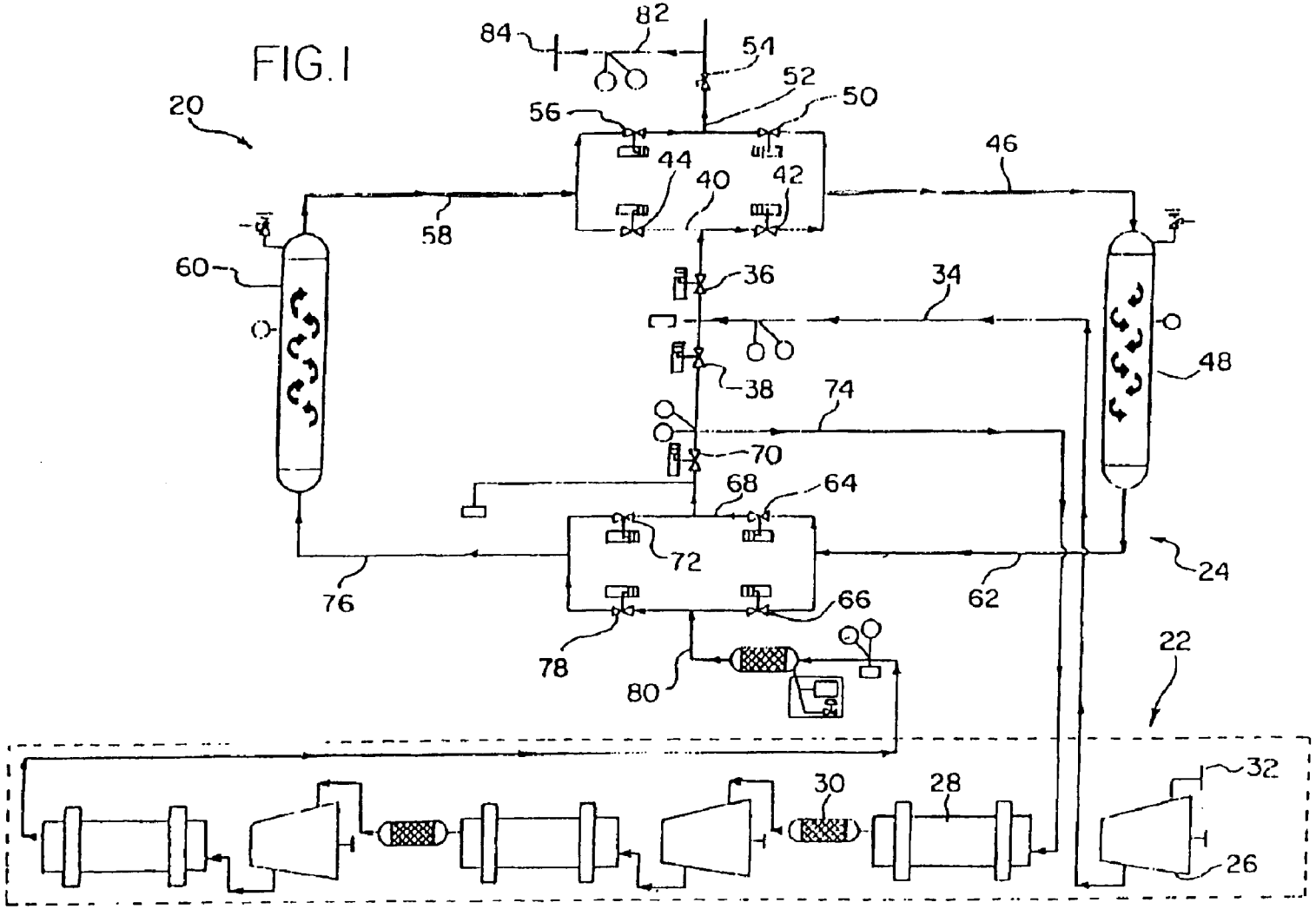
FIG. 1 is a schematic diagram of a novel regenerative compressed gas dryer system which incorporates the features of a first embodiment of the invention.

While the invention may be susceptible to embodiment in different forms, there is shown in the drawings, and herein will be described in detail, specific embodiments with the understanding that the present disclosure is to be considered as exemplification of the principles of the invention, and is not intended to limit the invention to that as illustrated and described herein.

The present invention provides a novel regenerative compressed dryer system 20, 20a for drying a gas, such as air. The system 20, 20a includes an integrated multi-stage compressor 22 and a dryer 24, 24a which have been combined to enhance the total system performance versus prior art dryer systems.

The compressor 22 used in the system 20, 20a of the present invention is a multi-stage compressor. Each stage in the compressor 22 includes a compression stage 26, a heat exchanger 28 and a moisture separator 30 or other like separator. The dryer 24, 24a is connected interstage to one of the compressor stages between the compression stage 26 and the heat exchanger 28 for regeneration. The dryer 24, 24a is also connected to the outlet of the compressor 22 for drying the gas. The present invention can be used with a high pressure compressor which may have as few as two or as many as five or six stages. With this type of multi-stage compressor, the best location for interstage regeneration may be the third or fourth stage.

Figure 2:
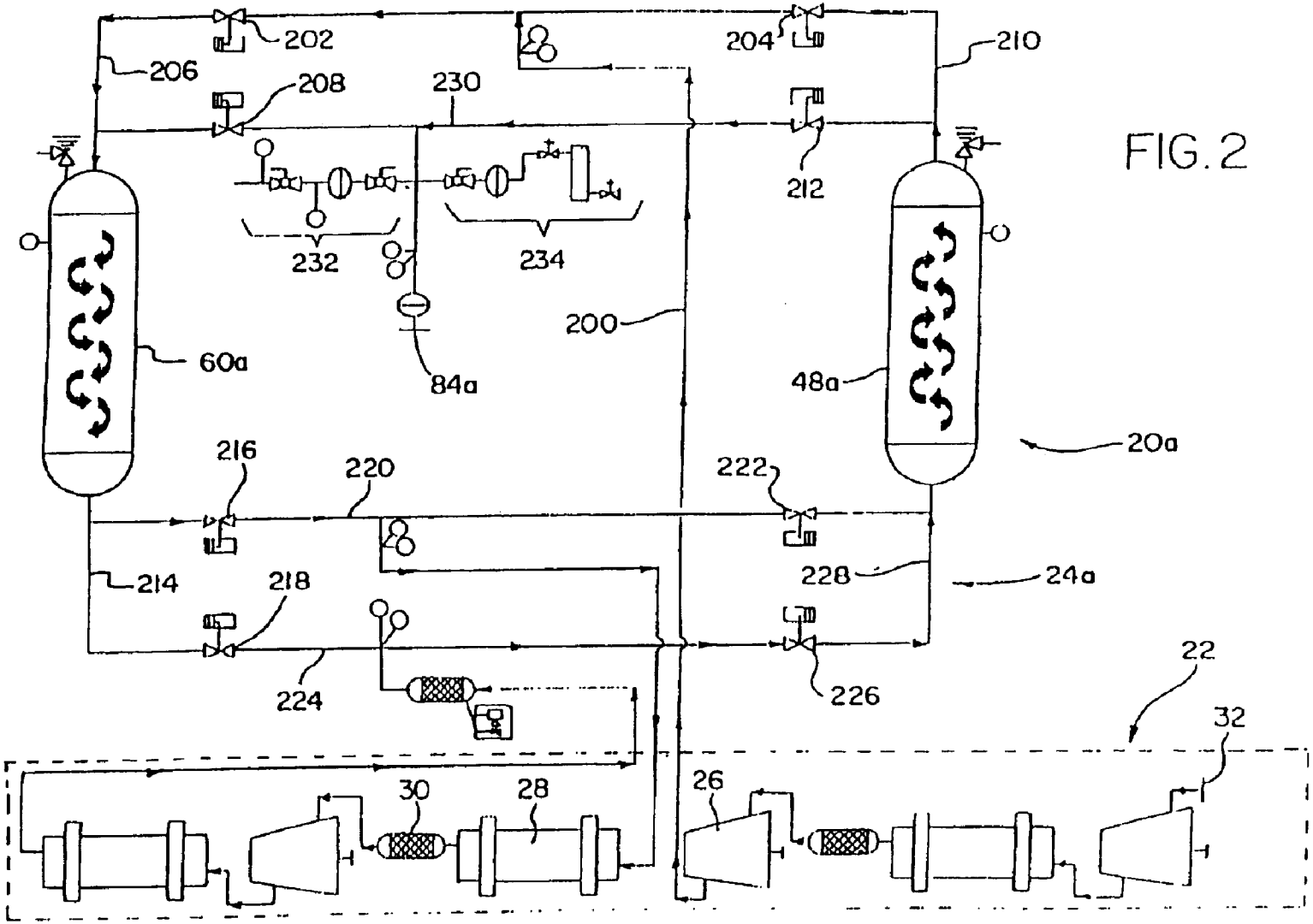
FIG. 2 is a schematic diagram of a novel regenerative compressed gas dryer system which incorporates the features of a second embodiment of the invention.

Two embodiments of the present system are illustrated in the drawings. It is to be understood that the embodiments of the dryer 22, 22a shown and described herein are two examples of dryers than can be used. Other embodiments of dryers can be provided so long as that regenerating tower is connected interstage so the compressor 22 and the drying tower is connected to the outlet of the compressor 22 and suitable communication means are provided for switching the communication between the dryer and the compressor 22 such that the functions of the towers can be reversed during operation. FIG. 1 illustrates a first embodiment of the system as used with a three stage compressor 22 wherein regeneration occurs interstage of the first stage. It is to be understood that multiple stages, such as six stages, can be provided in the compressor and the regeneration can occur interstage of any of the stage. FIG. 2 illustrates a second embodiment of the system as used with a three stage compressor 22 wherein regeneration occurs interstage of the second stage. Again, it is to be understood the multiple stages, such as six stages can be provided in the compressor and the regeneration can occur interstage of any of the stages. In each embodiment, a source of gas that is to be dried, such as air, is connected to the inlet 32 of the compression stage 36 of the first stage of the multi-stage compressor 22.

Attention is now directed to the embodiment of the system 20 shown in FIG. 1. Line 34 connects the compression stage 26 to valve 36 and to valve 38. Line 40 connects valve 36 to valve 42 and to valve 44. Line 46 connects valve 42 to a first end of a tower 48, described in further detail herein, and to valve 50. Line 52 connects valve 50 to valve 54 and to valve 56. Line 58 connects valve 56 to valve 44 and to an end of a second tower 60. Line 82 connects valve 54 to the delivery outlet 84 of the system 20.

Line 62 connects the opposite end of tower 48 to valve 64 and to valve 66. Line 68 connects valve 64 to valve 70 and to valve 72. Line 74 connects valve 70 to valve 38 and to the inlet of the heat exchanger 28 of the first stage of the compressor 22.

Line 76 connects the opposite side of tower 60 to valve 72 and to valve 78. Line 80 connects the outlet of the compressor 22 to valve 78 and to valve 66.

Each tower 48, 60 has a desiccant material therein that is used to remove moisture from the gas as it passes therethrough. A pressure gauge and a pressure relief valve are connected to each tower 48, 60. After the desiccant material becomes saturated and cannot efficiently remove moisture from the gas, the desiccant material needs to be regenerated.

The lines as described herein are suitable for transporting high temperature gas therethrough. Temperature gauges, thermowells, a thermostat, temperature switches, pressure gauges, and pressure switches are also provided to monitor the system 20. A control system (not shown) controls the flow of the gas through the system 20 as described herein.

This embodiment of the dryer 22 can include suitable structure for a stripping operation or suitable structure for a cooling operation a can include suitable structure for a stripping and cooling operation.

Now that the specifics of the system 20 have been described, the operation of the system 20 is described. As shown by the flow of gas as indicated by the arrows in FIG. 1, tower 48 is being regenerated and tower 60 is being used to remove moisture from the gas. By connecting the regenerating tower, shown as 48 in FIG. 1, of the dryer 24 to an interstage connection on the compressor 22, substantially better performance is achieved compared to prior art drying systems. Valves that are not described as being used to pass gas therethrough an closed.

When tower 48 is being regenerated, gas from the compression stage 26 of the first stage of the compressor 22 flows along line 34 through valve 36, along line 40, through valve 42, along line 46, through the one end of the tower 48, and through tower 48. As the gas heated from the compression stage 26 flows through the tower 48, the desiccant is regenerated. The gas flows out the opposite end of the tower 48 along line 62, through valve 64, along line 68, through valve 70, along line 74 to the inlet of the heat exchanger 28 of the first stage of the compressor 22. The gas then passes through the remainder of the compressor stages to the outlet of the compressor 22.

Once the control system determines that the tower 48 has been sufficiently heated to regenerate the desiccant therein, valves 36 and 70 are closed and valve 38 is opened such that gas heated from the compression stage 26 is directed back to the heat exchanger 28 by flowing along line 34, through valve 38 and then along line 74. This bypasses the tower 48 and conserves the pressure loss in the compressor 22.

When tower 60 is being used to remove moisture from the gas, gas from the outlet of the compressor 22 flows along line 80 through valve 78, along line 76, through one end of the tower 60 and through the tower 60. The desiccant in the tower 60 dries the gas as it passes therethrough. The dried gas then flows along line 58, through valve 56, along line 52, through valve 54, along line 82 to the delivery outlet 84 of the system 20.

Once the desiccant material in tower 60 becomes saturated and cannot efficiently remove moisture from the gas, the desiccant material needs to be regenerated. The control system is operated to open and close the appropriate valves such that the gas will now flow as described hereinafter.

When tower 60 is being regenerated, gas from the compression stage 26 of the first stage of the compressor 22 flows along line 34, through valve 36, along line 40, through value 44, along line 58, through one end of the tower 60 and through the tower 68. As the gas heated from the compression stage 26 flows through the tower 60, the desiccant is regenerated. The gas flows out the opposite end of the tower 60 along line 76, through valve 72 along line 68, through valve 70, along line 74 to the inlet of the heat exchanger 28 of the first stage of the compressor 22.

Once the control system determines that the tower 60 has been sufficiently healed to regenerate the desiccant therein, valves 36 and 70 are closed and valve 38 is opened such that gas heated from the compression stage 26 is directed back to the heat exchanger 28 by flowing along line 34, through valve 38 and then along line 74. Again, this bypasses the tower 48 and conserves the pressure loss in the compressor 22. At the end of regeneration, valves (not shown) can be activated to allow far "exhaust stripping" and/or "closed circuit cooling" to further improve dryer performance.

When tower 48 is being used to remove moisture from the gas, gas from the outlet of the compressor 23 flows along line 80 through valve 66, along line 62, through one end of the tower 48 and through the tower 48. The desiccant in the tower 48 dries the gas as it passes therethrough. The dried gas then flows along line 46, through valve 50, along line 52, through valve 54, along line 82 to the delivery outlet 84 of the system 20.

As can be seen from the above description, the gas flows through the towers 48, 60 is opposite direction. Lines 46, 62, 58, 76 to be connected to the tower 48, 60 such that the gas flows through the towers 48, 60 in the same direction.

Attention is now directed to the embodiment of the system 20a shown is FIG. 2. Line 200 connects the compression stage 26 to valve 202 and to valve 208. Line 206 connects valve 202 to valve 208 and to a first end of a tower 60a which is identical in structure to tower 60 in FIG. 1. Line 210 connects valve 204 to valve 212 and to a first end of a tower 48a which is identical in structure to tower 48 in FIG. 1.

Line 214 connects a second end of tower 60a to valve 216 and to valve 218. Line 220 connects valve 216 to valve 222 and to the inlet of the lieu exchanger 28.

Line 224 connects valve 218 to the outlet of the compressor 22 and to valve 226. Line 228 connects valve 226 to valve 222 and to the second end of the tower 48a.

Line 230 connects valve 212 to valve 208. Line 230 also connects' valves 212, 208 to an outlet 84a of the dryer 21a. An afterfilter is provided prior to the outlet 84a of the dryer 24a.

Identical to that of the first embodiment each tower 48a, 60a has a desiccant material therein that is used to remove moisture from the gas as it passes therethrough. A pressure gauge and a pressure relief valve are connected to each tower 48a, 60a. After the desiccant material becomes saturated and cannot efficiently remove moisture from the gas, the desiccant material needs to be regenerated.

The lines as described herein are suitable for transporting high temperature gas therethrough. Temperature gauges, thermowells, a thermostat, temperature switches, pressure gauges, and pressure switches are also provided to monitor the system 20a. A control system (not shown) controls the flow of the gas through the system 20a as described herein by using pilot gas bleed from line 230 by the structure shown at 232. Solenoids are used to activate the valves. In addition, a dew point monitor is provided by the structure shown at 234 to measure the moisture of the gas along line 230.

Now that the specifics of the system 20a have been described, the operation of the system 20a is described. As shown by the flow of gas as indicated by the arrows in FIG. 2, tower 60a is being regenerated and tower 48a is being used to remove moisture from the gas. By connecting the regenerating tower, shown as 60a in FIG. 2, of the dryer 24a to an interstage connection on the compressor 22, substantially better performance is achieved compared to prior art drying systems. Valves that are not described as being used to pass gas therethrough are closed.

When tower 60a is being regenerated, gas from the compression stage 26 of the second stage of the compressor 22 flows along line 200 through valve 202, along line 206, through the one end at the tower 60a, and through tower 60a. As the gas heated from the compression stage 26 flows through the tower 60a, the desiccant is regenerated. The gas flows over the opposite end of the tower 60a along line 214, through valve 216, along line 220, to the inlet of the heat exchanger 28 of the second stage of the compressor 22.

When tower 48a is being used to remove moisture from the gas, gas from the outlet of the compressor 22 flows along line 224 through valve 226, along line 228, through one end of the tower 48a and through the tower 48a. The desiccant in the tower 48a dries the gas as it passes therethrough. The dried gas then flows along line 210, through valve 212, along one 230 to the delivery outlet 84a of the system 20a.

Once the desiccant material in tower 48a becomes saturated and cannot efficiently remove moisture from the gas, the desiccant material needs to be regenerated. The control system is operated to open and close the appropriate valves such that the gas will now flow as described hereinafter.

When tower 48a is being regenerated, gas from the compression stage 26 of the second stage of the compressor 22 flows along line 200 through valve 204, along line 210, through the one end of the tower 48a, and through tower 48a. As the gas heated from the compression stage 26 flows through the tower 48a, the desiccant is regenerated. The gas flows out the opposite end of the tower 48a along line 228, through valve 222, along line 220, to the inlet of the heat exchanger 28 of the second stage of the compressor 22.

When tower 60a is being used to remove moisture from the gas, gas from the outlet of the compressor 22 flows along line 224 through valve 218, along line 214 through one end of the tower 60a and through the tower 60a. The desiccant in the tower 60a dries the gas as it passes therethrough. The dried gas then flows along line 206, through valve 208, along line 230 to the delivery outlet 84a of the system 20a.

As can be seen from the above description, the gas flows through the towers 48a, 60a in opposite directions. Lines 210, 228, 206, 214 can be connected to the towers 48a, 60a such that the gas flows through the towers 48a, 60a in the same direction.

It is to be understood that the embodiments of the dryer 22, 22a shown and described herein are two examples of dryers than can be used. Other embodiments of dryers can be provided so long as the regenerating tower is connected interstage to the compressor 22 and the drying tower is connected to the outlet of the compressor 22 and suitable communication means are provided for switching the communication between the dryer and the compressor 22 such that the functions of the towers can be reversed during operation.

While preferred embodiments of the present invention are shown and described, it is envisioned that those skilled in the art may devise various modifications of the present invention without departing from the spirit and scope of the appended claims.

The invention claimed is:

1. A system for drying gas from a source comprising:

a compressor having as inlet connected to the source, a compression stage, a heat exchanger, and an outlet:

a first tower and a second tower, each said tower containing desiccant material past which said gas flows; and communication means being capable of connecting said first tower to said compression stage and to said heat exchanger such that heated gas flows from said compression stage, through said first tower and into said heat exchanger to regenerate said desiccant material in said first tower, and being capable of connecting said second tower to said outlet of said compressor and to an outlet of said system such that gas flows from said outlet of said compressor, through said second tower and to said outlet of said system to remove moisture from said gas, said communication means further being capable of connecting said second tower to said compression stage and to said heat exchanger such that heated gas flows from said compression stage through said second tower and into said heat exchanger to regenerate said desiccant material to said second tower, and further being capable of connecting said first tower to said outlet of said compressor and to an outlet of said system such that gas flows from said outlet of said compressor, through said first tower and to said outlet of said system to remove moisture from said gas, wherein said communication means is used to connect said first tower to said compression stage and to said heat exchanger when said communication means is used to connect said second tower to said outlet of said compressor and to said outlet of said system, and wherein said communication means is used to connect said second tower to said compression stage and to said heat exchanger when said communication means is used to connect said first tower to said outlet of said compressor and to said outlet of said system.

2. A system as defined is claim 1, wherein said communication means is controlled by valves.

3. A system as defined in claim 1, wherein said towers are arranged such that the flow of gas through said tower that is being regenerated is in one direction, and the flow of gas through said tower that is being used to remove moisture from said gas is in an opposite direction.

4. A system as defined in claim 1, wherein said towers are arranged such that the flow of gas through said towers is in the same direction.

5. A system as defined in claim 1, wherein said compressor further comprises a separator.

6. A system as defined in claim 1, wherein said communication means further includes means for bypassing the flow of gas through said tower which is being regenerated such that gas flows from said compression stage to said heat exchanger.

7. A system as defined in claim 1, wherein said gas is air.

8. A system for drying a gas from a source comprising:

a multi-stage compressor having an inlet connected to the source and an outlet, each stage of said compressor comprising a compression stage and a heat exchanger;

a first tower and a second tower, each said tower containing desiccant material past which said gas flows; and communication means being capable of connecting said first tower to a compression stage and to a heat exchanger of one of said stages such that heated gas flows from said compression stage, through said first tower and into said heat exchanger to regenerate said desiccant material in said first tower, and being capable of connecting said second tower to said outlet of said compressor and to an outlet of said system such that gas flows from said outlet of said compressor, through said second tower and to said outlet of said system to remove moisture from said gas;

said communication means being further capable of connecting said second tower to a compression stage and to a heat exchanger of one of said stages such that seated gas flows from said compression stage, through said second tower and into said heat exchanger to regenerate said desiccant material in said second tower, and further being capable of connecting said first tower to said outlet of said compressor and to an outlet of said system such that gas flows from said outlet of said compressor through said first tower and to said outlet of said system to remove moisture from said gas, wherein said communication means is used to connect said first tower to said compression stage and to said heat exchanger of one of said stages when said communication means is used to connect said second tower to said outlet of said compressor and to said outlet of said system, and wherein said communication means is used to connect said second tower to said compression stage and to said heat exchanger of one of said stages when said communication means is used to connect said first tower to said outlet of said compressor and to said outlet of said system.

9. A system as defined in claim 8, wherein said communication means is controlled by valves.

10. A system as defined in claim 8, wherein said towers are arranged such that the flow of gas through said tower that is being regenerated is in one direction, and the flow of gas through said tower that is being used to remove moisture from said gas is in an opposite direction.

11. A system as defined in claim 8, wherein said towers are arranged such that the flow of gas through said towers is the same direction.

12. A system as defined in claim 8, wherein said multistage compressor has up to six stages.

13. A system a defined in claim 8, wherein each said stage further comprises a separator.

14. A system as defined in claim 8, wherein said communication means further includes means for bypassing the flow of gas through said tower which is being regenerated such that gas flows from said compression stage to said heat exchanger.

15. A system as defined in claim 3, wherein said gas is air.

*16. A method for compressing and drying gas, comprising compressing the gas in a multistage compressor, which compressor produces both an interstage compressed gas and a final stage compressed gas, and drying the final stage compressed gas by contacting the final stage compressed gas with a regenerable adsorbent, in which method said interstage compressed gas is used to regenerate the adsorbent.*

*17. A method as claimed in claim 16, wherein the multistage compressor comprises three compression stages.*

*18. A method as claimed in claim 17, wherein said interstage gas is produced by the first compression stage and is used to regenerate the regenerable adsorbent.*

*19. A method as claims in claim 17, wherein said interstage gas is produced by the second compression stage and is used to regenerate the regenerable adsorbent.*

*20. A method as claims in claim 16, wherein all the interstage compressed gas produced by a stage is used to regenerate the adsorbent.*

*21. A method as claimed in claim 16, wherein first and second beds of regenerable adsorbent are provided, each capable of operating in a drying mode to effect said drying, in which said final stage compressed gas is passed through the bed, and a regenerating mode to regenerate said adsorbent, in which said interstage compressed gas is passed through the bed, each bed switching from the drying mode to the regeneration mode.*

*22. A method as claimed in claim 21, wherein one of the first and second beds of regenerable adsorbents is in the drying mode, while the other of the first and second beds of regenerable adsorbent is in the regeneration mode.*

*23. A method as claimed in claim 16, wherein the adsorbent is retained in a fixed bed, the final stage compressed gas and interstage compressed gas as being caused to flow through the bed when the adsorbent is respectively being used to dry and is being regenerated.*

*24. A method as defined in claim 23, wherein the direction of flow of said final stage compressed gas through the fixed bed is opposite to the direction of flow of said interstage compressed gas through the bed.*

*25. A method as claimed in claim 16, wherein the interstage gas used to regenerate the adsorbent is cooled before undergoing further compression.*

*26. A method as claimed in clam 25 wherein the condensate is removed from the cooled interstage gas before the gas undergoes further compression.*

*27. A method for compressing and drying a gas, comprising the steps of:*

*compressing the gas in a first stage to produce a first interstage compressed gas;*

*passing the first interstage compressed gas through a first bed of regenerable adsorbent to remove moisture from and regenerate the adsorbent;*

*cooling the first interstage compressed gas and removing condensate from the gas;*

*compressing the cooled first interstage compressed gas in a second stage to produce a second interstage compressed gas;*

*cooling the second interstage compressed gas;*

*compressing the second interstage compressed gas to produce a final stage compressed gas;*

*cooling the final stage compressed gas;*

*passing the final stage compressed gas through a second bed of regenerable adsorbent to dry the gas; and*

*switching the flow of the second interstage compressed gas to the second bed of regenerable adsorbent and the flow of the final stage compressed gas to the first bed of regenerable adsorbent when the second bed of regenerable adsorbent becomes saturated with moisture from the final stage compressed gas.*

*28. Apparatus for compressing and drying a gas, comprising a compressor having a plurality of compression stages and capable of producing interstage compressed gas and final stage compressed gas, a dryer comprising a bed of regenerable adsorbent, in which the final stage compressed gas may be contacted with the adsorbent in order to dry the gas, and in which said interstage gas may be contacted with the adsorbent in order to regenerate the adsorbent.*

*29. Apparatus as claimed in claim 28, wherein the compressor comprises three compression stages, said interstage gas leaving the second compression stage being useable to generate the adsorbent.*

*30. Apparatus as defined in claim 28, wherein said bed of regenerable adsorbent comprises two beds of regenerable adsorbent.*

*31. Apparatus as claimed in claim 30, wherein the two beds of regenerable adsorbent are each operable in a drying mode to dry the gas, in which said final stage compressed gas flows through the bed, and a regeneration mode to regenerate the adsorbent, in which said interstage compressed gas flow through the bed, each bed being switchable between the drying mode and the regeneration mode.*

*32. Apparatus as claimed in claim 30, wherein one of the two beds of regenerable adsorbent is operable in the drying mode, while the other of the two beds of regenerable adsorbent is simultaneously operable in the regeneration mode.*

*33. Apparatus as claimed in claim 28, wherein a cooler is provided to cool the interstage compressed gas that has contacted the adsorbent, before the gas is further compressed.*

*34. Apparatus as claimed in claim 33, wherein a condensate separator is provided to remove condensate from the cooled interstage compressed gas.*

*35. Apparatus as claimed in claim 34, wherein the cooler and the condensate separator are integral with the compressor.*

*36. Apparatus for compressing and drying a gas, comprising:*

*a first stage compressor capable of producing first interstage compressed gas;*

*a cooler for the first interstage compressed gas;*

*a separator for removing condensate from the cooled first interstage compressed gas;*

*a second stage compressor capable of compressing the first interstage compressed gas to produce a second stage compressed gas,*

*a cooler for the second interstage compressed gas;*

*a third stage compressor capable of compressing the second interstage compressed gas to produce a final stage compressed gas;*

*a cooler for cooling the find stage compressed gas; and*

*first and second beds of regenerable adsorbent, each operable in a drying mode and a regeneration mode;*

*the arrangement being such that the first interstage compressed gas, prior to being cooled, is supplied to one of the first or second beds of regenerable adsorbent operating in the regeneration mode and the final stage compressed gas is supplied to the other of the first or second beds of regenerable adsorbent operating in the drying mode.*

* * * * *